United States Patent
Clower et al.

(10) Patent No.: US 8,103,870 B2
(45) Date of Patent: Jan. 24, 2012

(54) HIVE-BASED PEER-TO-PEER NETWORK

(75) Inventors: Matthew J. Clower, Gilroy, CA (US);
Vada W. Dean, Morgan Hill, CA (US);
Joseph E. Ross, Stanford, CA (US);
Ryan Parman, Los Banos, CA (US)

(73) Assignee: Foleeo, Inc., Morgan Hill, CA (US)

( * ) Notice: Subject to any disclaimer, the term of this patent is extended or adjusted under 35 U.S.C. 154(b) by 964 days.

(21) Appl. No.: 11/900,702

(22) Filed: Sep. 12, 2007

(65) Prior Publication Data

US 2008/0062870 A1  Mar. 13, 2008

Related U.S. Application Data

(60) Provisional application No. 60/923,868, filed on Apr. 17, 2007, provisional application No. 60/844,191, filed on Sep. 12, 2006.

(51) Int. Cl.
*H04L 29/06* (2006.01)
*G06F 7/04* (2006.01)
*G06F 17/30* (2006.01)
*G06F 15/16* (2006.01)
*G06F 15/173* (2006.01)

(52) U.S. Cl. ......... 713/161; 713/151; 713/153; 726/3; 726/30; 709/218; 709/219; 709/224; 709/225; 709/226; 709/228; 709/229; 709/231; 709/232

(58) Field of Classification Search ............. 713/161
See application file for complete search history.

(56) References Cited

U.S. PATENT DOCUMENTS

| | | | |
|---|---|---|---|
| 6,470,453 B1 * | 10/2002 | Vilhuber | 726/4 |
| 6,748,543 B1 * | 6/2004 | Vilhuber | 726/8 |
| 7,051,204 B2 | 5/2006 | Pitsos | |
| 7,065,579 B2 | 6/2006 | Traversat et al. | |
| 7,159,108 B2 * | 1/2007 | Hariharan et al. | 713/153 |
| 7,188,254 B2 * | 3/2007 | Somin et al. | 713/185 |
| 7,263,560 B2 * | 8/2007 | Abdelaziz et al. | 709/238 |
| 7,388,862 B2 * | 6/2008 | Tran et al. | 370/389 |
| 7,404,006 B1 * | 7/2008 | Slaughter et al. | 709/238 |
| 7,486,695 B1 * | 2/2009 | AbdelAziz et al. | 370/466 |
| 7,512,943 B2 * | 3/2009 | Hester et al. | 717/177 |
| 7,545,932 B2 * | 6/2009 | Durand et al. | 380/44 |

(Continued)

OTHER PUBLICATIONS

Cano, Juan-Carlos, "On the design of pervasive computing applications based on Bluetooth and a P2P concept" (IEEEXplore, URL:http://ieeexplore.ieee.org/xpls/abs_all.jsp?arnumber=1613599) Jan. 16, 2006.

(Continued)

*Primary Examiner* — Christopher Revak
*Assistant Examiner* — Carolyn B Kosowski
(74) *Attorney, Agent, or Firm* — David T. Millers

(57) ABSTRACT

A collaborative data transferring process can combine segments from all known servers and peer-to-peer (P2P) sources simultaneously, regardless of their native protocols. The process uses variable data block size that can be dynamically selected according to sizes provided by sources, e.g., according to the protocol of the source, and can generate hash values or validation codes on the fly so that compliance with validation techniques (if any) of other protocols is not required. The process may be classified as a P2P protocol, although it also contains centralized elements. Machine language implementations and low syntax overhead allow file exchanges over a homogeneous network with high throughput and low bandwidth consumption.

7 Claims, 3 Drawing Sheets

U.S. PATENT DOCUMENTS

| | | | |
|---|---|---|---|
| 7,571,344 B2 * | 8/2009 | Hughes et al. | 714/4 |
| 7,617,178 B2 * | 11/2009 | Chavez et al. | 1/1 |
| 7,680,937 B2 * | 3/2010 | Miller et al. | 709/226 |
| 7,707,248 B2 * | 4/2010 | Simard et al. | 709/204 |
| 7,716,660 B2 * | 5/2010 | Mackay | 717/173 |
| 7,739,390 B2 * | 6/2010 | Brahmbhatt et al. | 709/227 |
| 7,742,485 B2 * | 6/2010 | Zhang | 370/400 |
| 7,787,395 B2 * | 8/2010 | Bonsma | 370/254 |
| 7,809,946 B2 * | 10/2010 | Durand et al. | 713/171 |
| 7,814,146 B2 * | 10/2010 | Chavez et al. | 709/203 |
| 7,908,389 B2 * | 3/2011 | Zuckerman et al. | 709/231 |
| 2002/0049760 A1 * | 4/2002 | Scott et al. | 707/10 |
| 2005/0021617 A1 * | 1/2005 | Rusitschka | 709/204 |
| 2005/0047401 A1 * | 3/2005 | Garnero et al. | 370/353 |
| 2005/0203851 A1 * | 9/2005 | King et al. | 705/51 |
| 2007/0204003 A1 * | 8/2007 | Abramson | 709/217 |
| 2010/0057563 A1 * | 3/2010 | Rauber et al. | 705/14.53 |

OTHER PUBLICATIONS

Rhodes, Bradley J., "Wearable Computing Meets Ubiquitous Computing:Reaping the Best of Both Worlds" (IEEExplore, URL:http://ieeexplore.ieee.org/xpls/abs_all.jsp?arnumber=806695) Aug. 6, 2002.

* cited by examiner

HIVE-BASED PEER-TO-PEER NETWORK

CROSS-REFERENCE TO RELATED APPLICATIONS

This patent document claims benefit of the earlier filing dates of U.S. Provisional Patent Application No. 60/844,191, filed Sep. 12, 2006 and U.S. Provisional Patent Application No. 60/923,868, filed Apr. 17, 2007, which are hereby incorporated by reference in their entirety.

BACKGROUND

Peer-to-peer (P2P) networks generally have decentralized architectures that are easily scalable. This scalability results primarily because each node added to a P2P network adds network resources such as processing power, data storage capacity, and transmission bandwidth, which avoids many bottlenecks that server-client networks experience when adding clients. However, most P2P networks that have been deployed over the Internet have included centralized elements such as super-nodes or tracking nodes. FIG. 1 illustrates one example of a conventional P2P network 100. Network 100 includes peer nodes 110 and 130 and a tracking node 120 that are all capable of communicating with each other over the Internet 150. Each of peer nodes 110 and 130 is typically a computer that executes an application or other software 132 that implements the protocols required of peer nodes in P2P network 100. Tracking node 120 executes software 122 to implement the protocols and to perform additional functions such as maintaining peer lists 124 for distinct content that tracking node 120 tracks.

In a typical operation of P2P network 100, a user at a requesting peer node 110 seeks to retrieve or download specific content 134 and may download a file 136 that identifies tracking node 120 and includes known hash values for use in error detection. Requesting node 110 can then contact tracking node 120. In response, tracking node 120 provides to requesting node 110 a peer list 124 identifying active nodes 130 having copies of content 134. Requesting node 110 uses peer list 124 to initiate transfers of pieces of content 134 by contacting peer nodes 130 having copies of content 134, and peer nodes 130 begin transferring of data via the Internet 150 to node 110. As data are being received, requesting node 110 assembles the data into pieces, which have a fixed size set when content 134 was originally hashed. Requesting peer nodes 110 can simultaneously receive multiple pieces of content from many peer nodes 130 to provide a high download data rate. Requesting node 110 calculates a hash value from each piece received and compares calculated hash values to the known hash values 136. When a hash value calculated from a received piece does not match the hash value from known hash values 136, the piece is discarded, and requesting node 110 contacts a peer node 130 to have the entire piece resent.

Current P2P network 100 has several disadvantages. In particular, tracking node 120 has burdens that increase with the network size and amount of distinct content tracked. In particular, tracking node 120 generally must monitor peer nodes 130 and update peer lists 124 to accurately indicate peer nodes 130 that are currently available. This may require nodes 130 constantly polling tracking node 120, which consumes bandwidth and processing capacity of tracking node 120. Additionally, tracking node 120 may maintain peer lists 124 for a large variety of content and may receive multiple simultaneous requests for content. As a result, monitoring and transmitting peer lists from tracking node 120 can become a bottleneck that slows the entire network 100.

Effective file transfer rates are also diminished in network 100 because pieces are validated as a whole. Typically only a relatively small number of received bits are errors, but when these few errors arise, the requesting node 110 must discard an entire piece. Discarding mostly good data in a large piece and repeating the downloading of the piece slows the effective data transfer rate of network 100.

Another disadvantage of P2P network 100 is that malicious peers could intentionally provide invalid pieces of data that are designed to provide the known hash for a valid piece. Accordingly, invalid pieces may not be detected and can corrupt the copy of content 134 at requesting peer 110. Tracking node 120, which upon completion of a transfer identifies the requesting peer 110 as a source of content 134, allows node 110 to unwittingly propagate the invalid piece to other nodes. Bad data can thus be proliferated through network 100.

A limitation of network 100 is that the P2P protocol implemented in network 100 may be incompatible with protocols implemented in other networks. In particular, peer nodes 130 transfer pieces of a specific fixed size that is required for the consistency of calculated and known hash values. Accordingly, a node 140 storing the desired content 134 but executing software 142 implementing an incompatible protocol, i.e., using different pieces or piece sizes, would be unable to participate in providing content 134 to requesting node 110.

In view of the current state of P2P networks, systems and methods are sought that eliminate or reduce bottlenecks at super-nodes or tracking nodes, improve effective data transfer rates when minor errors occur, improve identification and prevention of malicious data corruption, and are able to bridge or incorporate nodes using different protocols in supplying requested content.

SUMMARY

In accordance with an aspect of the invention, each peer of a P2P network maintains tracking information specific to its active threads, so that it is no longer necessary to re-poll the tracking mechanism. Instead, tracking information is exchanged dynamically between a swarm of peers propagating through a network. A peer can join a swarm by initially contacting a central hive and receiving an initial peer list. Peer connections are initiated, temporal peer information is exchanged between peer connections, and the process can be repeated across the network propagating current relevant data. Accordingly, a bottleneck that may result from heavy reliance on a central tracking node can be eliminated.

In accordance with another aspect of the invention, data can be transferred in pieces having dynamically selected sizes and hash values so validation of the pieces can be determined on the fly. More specifically, the requesting node can send identifying information for any piece of a file to multiple peer nodes having copies of that piece of the file, and the contacted peer nodes can remotely calculate a hash value for the identified piece. When the remote peers return the calculated hash values to the requesting peer, the requesting peer can first determine whether all of the remotely calculated hash values are the same and then compare the remotely calculated value to a locally calculated value. Partial pieces can be verified in the same manner. This allows data transfers to be more efficient because a large block of data does not need to be discarded when a small piece contains an error. Additionally, the sources of the pieces of data can be individually graded for reliability and dropped from peer lists if data is consistently unreliable.

In accordance with yet another aspect of the invention, a P2P network transaction can be conducted across multiple bridged networks, even if the bridged networks communicate over incompatible protocols because data transfers are not restricted to any particular size and hash values can be calculated by any peer node having an identical copy of the file being transferred.

In accordance with still another aspect of the invention, the cost of information distribution and the cost of on-line transactions may be handled separately. In particular, an internet site that distributes media including copyrighted material can collect revenue from a variety of sources including license fees from buyers, subscriptions, fees for collecting and providing market information, and advertising fees. A portion of the revenue generated by the site can be placed in trust for payments to copyright owners, for example, when a license agreement is reached, which may occur after the copyrighted material is downloaded. The facilities of the site may also be used to "legalize" a previous download, which may have been from another source.

BRIEF DESCRIPTION OF THE DRAWINGS

Use of the same reference symbols in different figures indicates similar or identical items.

DETAILED DESCRIPTION

A peer-to-peer network in accordance with an embodiment of the present invention can employ dynamically selected piece sizes for data transfer and for error detection processes using hash values that peer nodes calculate on-the-fly. The variable piece size facilitates bridging between networks and improves effective data transfer rates. The on-the-fly calculation of hash or error detection values assists in detection and removal of unreliable or malicious nodes and enables the P2P network to reduce bottlenecks associated with overburdening of tracking mechanisms or super-nodes.

Figure 1:
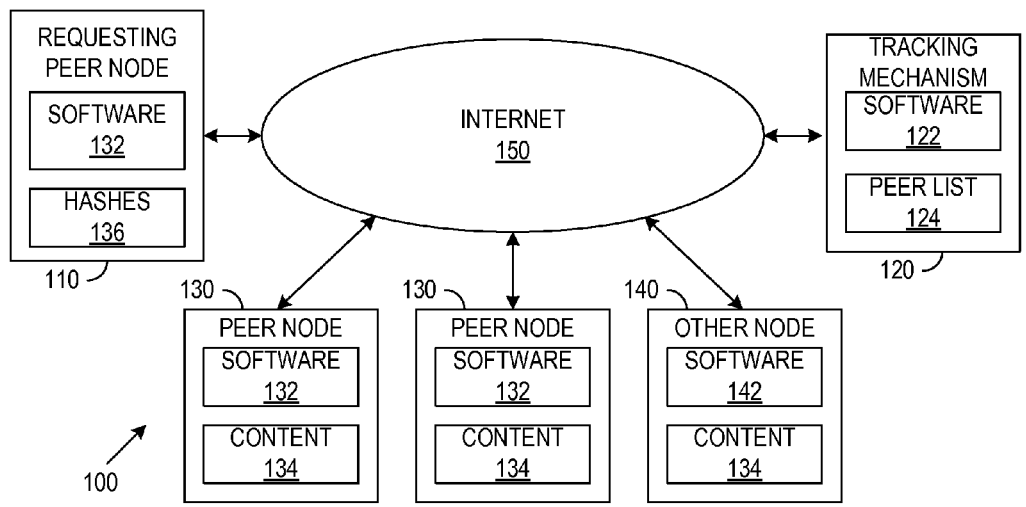
FIG. 1 shows a conventional peer-to-peer network.
Figure 2:
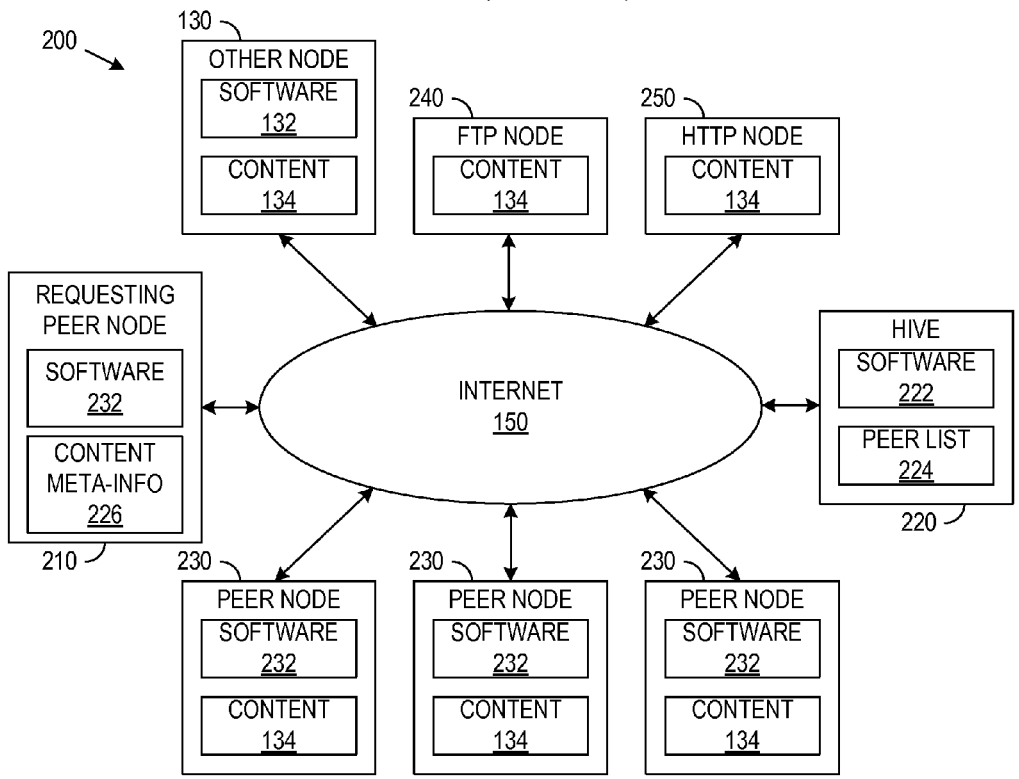
FIG. 2 shows a peer-to-peer network in accordance with an embodiment of the invention.

FIG. 2 illustrates a P2P network 200 in accordance with an embodiment of the invention. Network 200 includes a set of peers 210 and 230 executing an application or other software 232 implementing a protocol in accordance with the present invention, a super-node or hive 220 executing software 222 implementing additional functions of the protocol described further below, other nodes 130 executing software 132 appropriate for another P2P protocol, and nodes 240 and 250 implementing only a basic data transfer protocol such as FTP and HTTP. Nodes 210 and 230 are able to communicate with nodes 210, 220, 230, 240, 250 and 130 via a lower level network such as the Internet 150.

Each of nodes 210, 220, 230, 240, 250, and 130 may be a computer or other device with appropriate hardware and software for data storage and connection to the Internet 150. The P2P protocol in accordance with the embodiment of the invention implemented in nodes 210, 220, and 230 employs dynamically selected piece sizes and on-the-fly generated error detection values.

Figure 3:
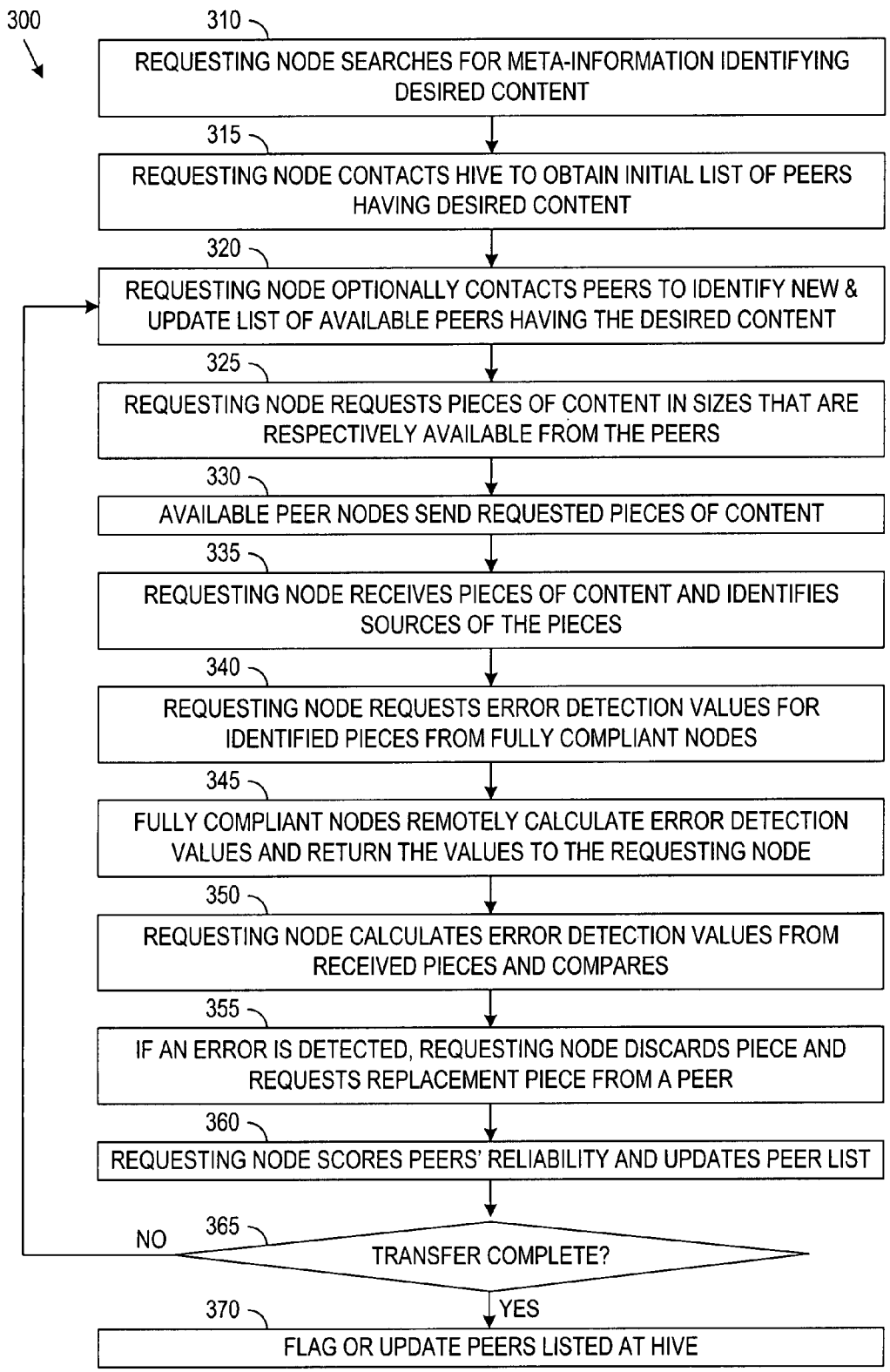
FIG. 3 is a flow diagram of a data transfer process in accordance with an embodiment of the invention.

FIG. 3 illustrates a process 300 for transfer of content over a network and is described herein with reference to the specific network 200 of FIG. 2. Process 300 begins when a peer node 210 as a requesting node executing software 232 that is compliant with a P2P protocol in accordance with an embodiment of the present invention searches the Internet 150 for content that a user of the requesting node 210 desires. For example, node 210 may access a web site containing lists of content, and by making a selection at the web site, node 210 can obtain meta-information uniquely identifying desired content 134. The content 134 can be any type of digitally stored material including, for example, software or data files of all types and the selection process may include obtaining a license to copy and use the content. A section below entitled MEDIA COMMERCE VIA INTERNET describes systems and methods for media commerce via internet that can employ peer-to-peer networks and protocols such as described herein.

Requesting node 210 in a step 315 contacts hive 220 and requests an initial list of peers having copies of the desired content 134. Hive 220 may be a centralized server that holds information about threads and their swarms or may be a peer node, which is the same as other peer nodes 230 but containing an integrated service that maintains information about threads limited by the interest of the client and its neighboring peers 230. In either case, hive 220 functions as a gateway for peers into a swarm and responds to requesting node 210 by sending a peer list for the desired content 134 to requesting node 210.

The returned peer list identifies a swarm for the desired content 134 and may particularly identify peer nodes 230 that are compliant with the P2P protocol used in process 300, peer nodes 130 that implement other P2P protocols, and peers 240 and 250 that only implement basic data transfer protocols such as FTP and HTTP. The peer list may also include indications of the capabilities of each node and particularly indicate which nodes 230 are compliant with the chosen P2P protocol. In a step 320, requesting node 210 can contact one or more compliant nodes 230 to identify additional nodes 230, 130, 240, and 250 that are available and have the desired content 134. The peers thus identified at requesting node 210 form a network of peers, sometimes referred to herein as a swarm, that can operate on the particular thread associated with desired content 134. The requesting node 210 optionally may perform step 320 repeatedly or in parallel with steps 325 to 360 to update the list of peers in the swarm.

Requesting node 210 in step 325 requests pieces of the desired content 134 from available nodes 230, 130, 240, and 250. In general, the size of each request can be selected on the fly. In particular, requesting node 210 can use information that indicates the capabilities of nodes 230, 130, 240, and 250 to determine the respective piece sizes requested from nodes 230, 130, 240, and 250. Requesting node 210 can thus adapt to other P2P protocols and make requests from non-compliant nodes 130 of pieces having sizes that may be mandated by other P2P protocols. More generally, requesting node 210 can request specific pieces using the required syntax of the protocol implemented by each target node 130. For compliant nodes 230, requested pieces can be any portion of content 134 and may be identified as a specified amount, e.g., a number of bytes, starting at an offset from the beginning of content 134. Pieces could also be identified using other techniques such as by identifying beginning and ending offsets of the requested piece within desired content 134. Nodes 230, 130, 240, and 250 send the requested pieces of content 134 over the Internet 150 or other physical network in step 330.

Pieces of data are received in step 335 at requesting node 210. The pieces received may be of different sizes because different sizes were requested or because some requests were not received completely. Node 210 in step 340 requests from multiple compliant nodes 230 hash or error correction values for the received pieces or other portions (e.g., a part of a received piece) of the desired content. These requests for hash values in general identify a specific portion, e.g., by providing an offset and a size of the portion of desired content 134. In step 345, the contacted compliant nodes 230 calculate the hash or error detection values using their copy of content 134 and return the calculated values to requesting node 210. Such hash or error detection values can be calculated using known techniques such as SHA-1 and MD5. Requesting node 210 in step 350 can then determine whether the remotely calculated hash values are all the same, calculate the hash value locally using the same techniques used by the remote peers 230, and determine whether the hash value that requesting node 210 calculates based on the received material is equal to the remotely calculated hash value. If hash values differ, an error is detected, and requesting node 210 can discard a piece containing an error and request a replacement (step 355) and/or score the node supplying the piece or the hash value as providing bad information (step 360). A node that repeatedly provides bad information can be removed from the peer list that requesting node 210 maintains.

The transfer of the desired content is complete in step 365 when requesting node 210 has received and validated all of the pieces of data that make up content 134. Node 210 can then contact hive 220 and update the peer list 224 for content to include the reliable sources 230, 130, 240, and 250 and requesting node 210 as having copies of content 134. Also at this time, requesting node 210 can contact hive 220, and any unreliable or unavailable sources 230, 130, 240, and 250 can be flagged in the peer list 224 kept by hive 220 in a step 270.

Process 300 provides several advantages over prior P2P network processes. In particular, the node lists transferred in steps 315, 320, and 370 can include peers that use other P2P protocols or no P2P protocol at all. Accordingly, process 300 can bridge P2P networks and increase the number of available sources of the desired content, improving effective data transmission rates. In steps 340 and 345, hash or error detection values are calculated on the fly for pieces of data having a size that cannot be easily predicted, making it difficult for a malicious node to construct and send invalid data that would provide the correct hash values. In contrast, P2P protocols using fixed-sized pieces with known hash values allow the malicious creation of invalid pieces of data that can defeat their validation procedures. Also, in step 355, the data discarded when errors are detected can be smaller because the error detection can be applied to smaller pieces than required by some protocols having fixed piece sizes, again improving effective data transfer rates.

The processes described above, in general, can be embodied in firmware, software, or other instructions that can be processed on a computer and/or stored in a computer readable medium. Such computer readable media include but are not limited to CD-ROM, DVD-ROM, integrated circuit memory, magnetic media, optical media, and other storage devices, which may be directly connected to or incorporated in a computer or accessible through a network such as the Internet.

Media Commerce Via Internet

The ability to post and download materials through the internet has led people to copy copyrighted material without payment to or permission from the copyright owners. As a result, media companies and other copyright owners have expended considerable legal resource to curtail illegal downloading, and many peer-to-peer networks have been closed down because those networks lacked mechanisms to compensate the copyright owners. These legal efforts still have not succeeded in preventing unauthorized downloading because of the difficulty of the tracking downloading and the ease with which new sources of the material arise. Further, users may have little incentive to purchase licenses because online media commerce typically punishes users for purchasing legal content by restricting usage and confining user-generated data. Many believe that innovations in online commerce have been severely limited by media companies' inability to monetize legal access to their content in a consumer friendly manner.

In addition to the need for better business methods that are consumer friendly and compensate copyright owners, networks for selecting and accessing online content can also use improvement. For example, powerful file transfer protocols generally require heavy learning investments and deep computer knowledge to use and maintain. Many peer-to-peer networks are limited because they typically allow users to search and access only files available via its protocol, and the content available through the peer-to-peer networks has virtually no quality guarantees, requiring users to filter good and bad content. In general, existing solutions for media commerce via the internet generally force users to accept restricted content and/or limit choice and customization.

In accordance with an aspect of the invention, legal commerce of media between a consumer and a business or another consumer and via the internet is enabled. The invention embodies several innovations:

Machine-Code-Based Protocol for P2P and Other Networks: One embodiment of the invention features a new protocol, and a new approach to designing and implementing protocols, over networks, including peer-to-peer networks. The new protocol approach is more efficient than the existing art by using new methods and features that reduce overhead to an absolute minimum, where "overhead" includes, but is not limited to, the headers, descriptors, encoded content, identifiers, addresses, and other components sent across the network. Instead, media is identified through a content dependent fingerprint. The result is that peer-to-peer transfer speeds are increased. Overhead is reduced by, among other methods, using certain machine language alternatives to human readable text. The result is less bandwidth required for transfer, enabling increased transfer speed and volume.

Real-Time Database for P2P and Other Networks: The invention includes a new system for managing databases used to keep track of nodes, including but not limited to peers (users connected via a particular connection) and peer data, servers, trackers and related archetypes. This system improves on existing art by, for example, differentiating between the real-time data functions and persistent data functions. The resulting increased efficiency enables numerous benefits, including improved transfer within the network, the ability to interact more seamlessly with other protocols, and the ability to adapt, in interacting with other protocols, to dynamic changes.

By way of example, in the P2P context, the real-time database actively manages hash locations across platforms and IP addresses. Dividing the real-time database components from the persistent database components significantly improves speed, efficiency, and scalability.

P2P "Hydra": Another embodiment of the invention includes a P2P "hydra" platform that can search and exchange files across multiple P2P networks. This approach can be replicated in non-P2P contexts.

Network File Evaluation: Yet another embodiment of the invention includes new methods and means to evaluate, sort, promote, select, and tag entertainment content and other shared files across P2P and other networks, and to rank them based on metadata, user rankings, community comments, file quality and size, and other measures.

File Fingerprinting: Still another embodiment of the invention creates unique identifiers for files based on binary content. Features include high-seed prime numbers and nonreversible compression to determine static length unique identifiers for any binary stream.

"Prime Number" Data Compression: Another embodiment of the invention includes methods for encoding and/or compressing data, which exploits mathematical features of prime numbers. Applications extend beyond P2P networks to all fields that use data.

Network Encryption: Another embodiment of the invention includes new methods and systems of encryption protecting files and user data across a network, including P2P networks.

Business method for the electronic management of media licenses: Another embodiment of the invention includes an interactive system, available online and through other electronic means, enabling users to use a P2P network platform to identify, purchase, store, and/or maintain always-accessible proof of their possession of stand-alone licenses for media content, regardless of how that media content was acquired in the past or will be acquired in the future.

The server will not store a list of "bearer instruments" as proposes in U.S. Pat. App. Pub. Nos. US 2006/0170759 A1 and US 2005/0273805 A1, but rather a list of licensed content. The intention is not to use the list of licensed content to redeem; rather the intention is to maintain and, when needed, provide proof of rights.

Business method for an online license agency service: In accordance with a further aspect of the invention, an interactive system, available online and through other electronic means, can enable copyright owners to put up stand-alone licenses and related legal rights for sale to the public.

Figure 4:
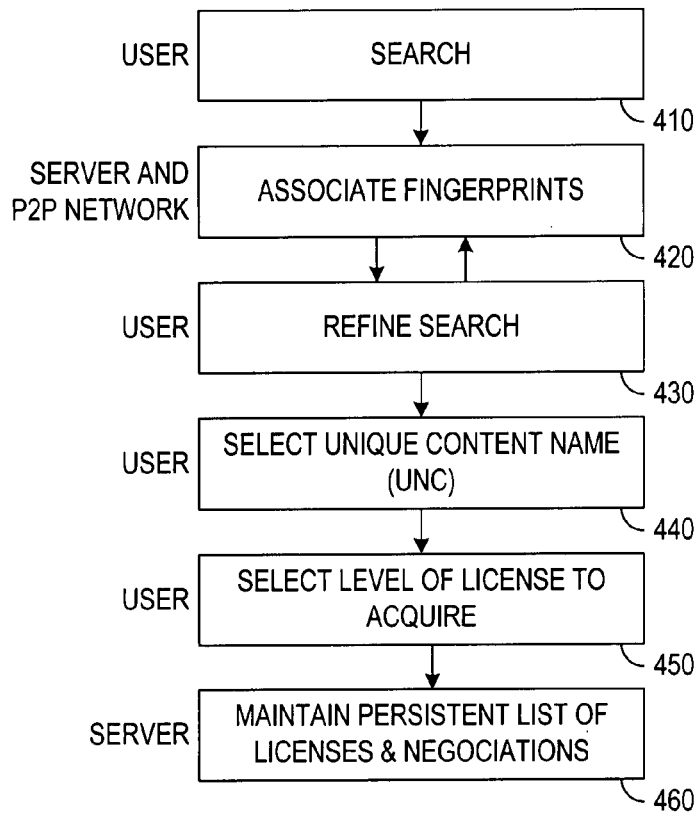
FIG. 4 is a flow diagram of a consumer interaction with an online service to obtain media.

Business method for an online license negotiating service: Another embodiment of the invention includes an interactive system, available online and through other electronic means, enabling consumers to pay for services seeking to negotiate a license for media content regardless of how and when the media content will be acquired. FIG. 4 illustrates an online interaction in accordance with an embodiment of the invention. Initially, a user seeks a title/name/unique ID of the content they seek to license by, among other methods, searching a P2P network. In step 410 of FIG. 4, a user initiates a search a web site, and in step 420, the server for the web site and linked peer-to-peer networks identify fingerprints of media satisfying the search criterion. The user can then refine the search in step 430 or select in step 440 the media content desired. In step 450, the user selects the level of license desired for the selected media and makes a payment of an estimate amount. The user payments may be held in escrow or trust pending the conclusion of license negotiation. The sites server in step 460 then maintains a persistent list of the licenses and negotiations for the all of the content the user has previously accessed/downloaded.

The server can update the persistent list of user selected media to reflect successful and pending license negotiations.

In accordance with a further aspect of the invention, a percentage of total site revenue including sources other than just license fees paid by consumers can be made available to compensate copyright holders. For example, a portion of the revenue from paid advertising on the site and revenue generated through sale of statistical market information can be paid to copyright owners, effectively reducing the fees required from consumers, and thereby encouraging consumers to use the site.

Figure 5:
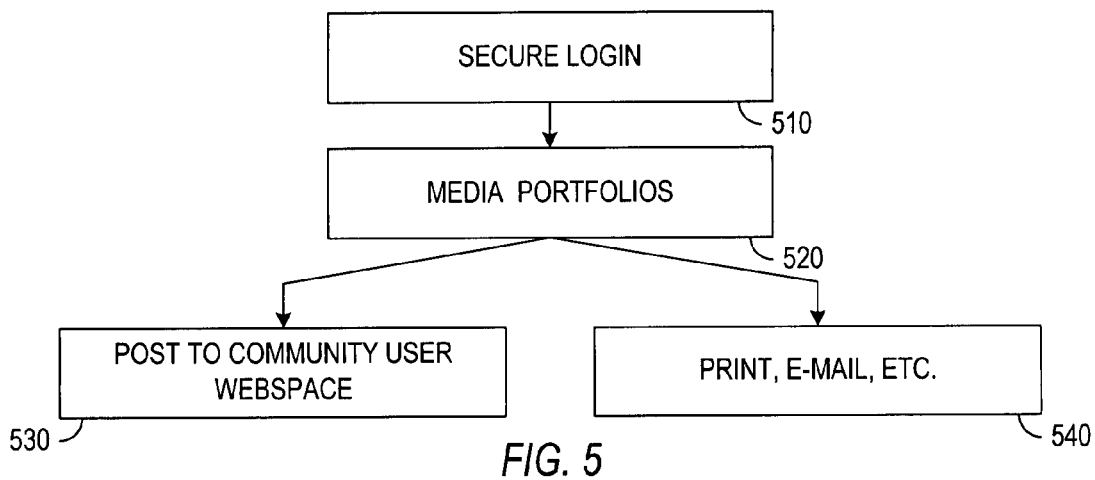
FIG. 5 is a flow diagram of process for access of a consumer's portfolio of downloaded media and posting of media related information.

The site implementing the process of FIG. 4 can also allow a user to access his or her portfolio of media and post feedback. For example, in the process of FIG. 5, a user accesses his or her media portfolio 520 through a secure login process 510. The user in step 530 can then post to the community user webspace information or messages such as ratings of media for quality or objectionable content. The user could alternatively use the portfolio information, for example, to print the information or e-mail the information where desired.

Citizenship Ratings with an online network: Another embodiment of the invention includes a process that weigh a user's contextual participation, support, contributions, payments, and other behavior features within membership areas (both formal memberships and informal memberships). Citizenship ratings can then be used to weight user ratings of files, postings, contributions, and other behavior.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A process comprising:
   (a) identifying nodes on a network that have copies of desired content;
   (b) requesting that a first of the nodes send a first piece of the desired content to a requesting node, the first piece having a first size;
   (c) requesting that a second of the nodes send a second piece of the desired content to the requesting node, the second piece having a second size that differs from the first size;
   (d) requesting that a first plurality of the nodes respectively calculate and return first remotely-calculated hash values for the first piece of the desired content;
   (e) calculating a first local hash value from the first piece as received at the requesting node;
   (f) receiving the remotely-calculated hash values for the first piece of the desired content;
   (g) comparing the first local hash value and the first remotely calculated hash values to determine whether the first piece as received at the requesting node is valid;
   (h) requesting that a second plurality of the nodes respectively calculate and return second remotely-calculated hash values for the second piece of the desired content;
   (i) calculating a second local hash value from the second piece as received at the requesting node;
   (j) receiving the remotely-calculated hash values for the second piece of the desired content; and
   (k) comparing the second local hash value and the second remotely calculated hash values to determine whether the second piece as received at the requesting node is valid,
   wherein the requesting node dynamically selects the first size of the first piece of the desired content according to the capabilities of the first of the nodes and the requesting node selects the second size of the second piece of the desired content according to the capabilities of the second of the nodes.

2. The process of claim 1, wherein the first of the nodes implements a first peer-to-peer protocol allowing transfers of pieces of sizes selected on the fly.

3. The process of claim 2, wherein the second of the nodes implements a second peer-to-peer protocol that requires transfers of pieces having the second size.

4. The process of claim 2, wherein the second of the nodes implements a data transfer protocol and is not compliant with any peer-to-peer protocol.

5. The method of claim 1, further comprising the nodes in the first plurality respectively calculating the first remotely-calculated hash values from respective copies of the desired content, only in response to the request in step (d).

6. The method of claim 1, further comprising the nodes in the second plurality respectively calculating the second remotely-calculated hash values from respective copies of the desired content, only in response to the request in step (g).

7. A non-transitory computer readable media containing instructions that when executed perform the process of claim 1.

* * * * *